(12) United States Patent
Attwater et al.

(10) Patent No.: US 6,629,069 B1
(45) Date of Patent: Sep. 30, 2003

(54) SPEECH RECOGNIZER USING DATABASE LINKING

(75) Inventors: David John Attwater, Suffolk (GB); Hilary Richard William Greenhow, Suffolk (GB); Peter John Durston, Suffolk (GB)

(73) Assignee: British Telecommunications a public limited company, London (GB)

( * ) Notice: Subject to any disclaimer, the term of this patent is extended or adjusted under 35 U.S.C. 154(b) by 0 days.

(21) Appl. No.: 09/720,988

(22) PCT Filed: Jul. 8, 1999

(86) PCT No.: PCT/GB99/02167
§ 371 (c)(1),
(2), (4) Date: Jan. 3, 2001

(87) PCT Pub. No.: WO00/05710
PCT Pub. Date: Feb. 3, 2000

(30) Foreign Application Priority Data

Jul. 21, 1998 (EP) .............................................. 98305804

(51) Int. Cl.[7] .............................................. G10L 15/06

(52) U.S. Cl. ........................ 704/231; 704/236; 704/254; 704/255; 704/270; 704/275

(58) Field of Search ................................. 704/231, 234, 704/236, 243, 270, 275, 254, 255; 379/88.01

(56) References Cited

U.S. PATENT DOCUMENTS

| 5,758,322 A | 5/1998 | Rongley ..................... 704/275 |
| 5,778,344 A | 7/1998 | Attwater et al. ............ 704/275 |
| 6,122,613 A | * 9/2000 | Baker ......................... 704/235 |
| 6,411,683 B1 | * 6/2002 | Goldberg et al. ........ 379/88.01 |

FOREIGN PATENT DOCUMENTS

WO    WO 96/13030    5/1996

* cited by examiner

Primary Examiner—Susan McFadden
(74) Attorney, Agent, or Firm—Nixon & Vanderhye, PC

(57) ABSTRACT

A speech recogniser is provided for identifying entries in a database. Results from the recognition of a user's speech are combined with each other and optionally with reference to data in the database in order to maximise the accuracy of an identified entry. An output is also provided which gives an indication of the likely accuracy of the identified entry.

24 Claims, 9 Drawing Sheets

SPEECH RECOGNIZER USING DATABASE LINKING

This invention relates to speech recognition apparatus, particularly but not exclusively to speech recognition apparatus which receive a plurality of related speech signals and use the received speech signals to identify an entry contained in a database.

In an operator based telesales service which requires the user to provide an address, the postcode is often requested. The postcode is used to access an address database and to identify an entry from the address database corresponding to the postcode provided. For unique identification of the required address amongst the subset of addresses all having that postcode in common, provision of a house name or number is all that is required. However, in automated systems for retrieving an address from an address database the accuracy of postcode recognition alone is not sufficiently accurate. For example, the accuracy for a postcode recogniser has been reported to be as low as 66% when speech recognition is performed on speech received from a telephone network. Therefore a more extensive dialogue requesting more information from the user is required. If a service is interactive then any uncertainty about whether a recognition result is correct may be dealt with by asking the user to confirm that the recognised utterance is correct. However if the service is offline then the speech recognition apparatus must make the best use of all the information it has. For example, in a service which requires an entry in a database to be identified this information will be any speech signals the speech recognition apparatus has received from the user and the information in the database regarding valid entries in the database. In a customer account database, for example, the user may provide speech signals representing their name and their account number. A speech recognition process is performed both on the speech signal representing the name and on the speech signal representing the account number, then the recognised name and account number may be compared with the entries in the database. If the recognised name and account number do not provide a valid entry then the identification of an entry is considered to have failed.

According to the present invention there is provided a speech recognition apparatus comprising input means for receiving a speech signal; recognition means coupled to the input means and arranged to provide a first set of one or more items falling within a first vocabulary, the items being derived from a first received speech signal; and provide a second set of one or more items falling within a second vocabulary, the items being derived from a second received speech signal; and comparison means arranged to perform an intersection of the first and second set whereby the combined set comprises items which fall within both the first set and items which fall within the second set; provide a resulting combined set of items; and provide as an output a grading signal in dependence upon the number of items which fall within the combined set.

According to another aspect of the invention there is also provided a speech recognition apparatus comprising input means for receiving a speech signal; recognition means coupled to the input means and arranged to provide a first set of one or more items falling within a first vocabulary, the items being derived from a first received speech signal; and provide a second set of one or more items falling within a second vocabulary, the items being derived from a second received speech signal; and comparison means arranged to perform a union of the first and second set whereby the combined set comprises items which fall within the first set of items or items which fall within the second set; and provide a resulting combined set of items.

The recognition means may be further arranged to generate an output set of items falling within the combined set of items, the output set derived from a third received speech signal.

Alternatively the first received signal is different from the second received signal and the first set may be derived from the first received signal by generating an intermediate set of items falling within an intermediate vocabulary comprising items in a first field of the database, the intermediate set of items corresponding to the first received speech signal; the first set of items comprising items in a second field of an entry in the database which have items from the intermediate set in the first field of the entry.

The second set of items may be similarly derived from the second received signal. The third set of items may be derived similarly in embodiments of the invention utilising a third received signal.

The size of the first and second sets may be limited to a predetermined number of items prior to comparison.

Corresponding methods are also provided.

Embodiments of the invention will now be described by way of example with reference to the accompanying drawings in which FIG. 1 shows an apparatus according to one embodiment of the invention;

In the embodiment of the invention described here the objective is to identify any UK postcode from a plurality of utterances received, these utterance may be received via a telephone network. The output from a speech recogniser in response to speech signals received from a user (e.g. speech signals representing county, postcode, road) is combined with information in an address database in order to maximise the accuracy of the identification process. In variants speech signals relating to separate items of information such as county, postcode etc. may be provided as part of the same continuous user utterance.

Whilst the embodiment of the invention described here relates to identifying entries in a database using speech signals provide by a user, it will be understood that similar principles apply to any type of identification which relies on a pattern matching process, for example optical character recognition, face recognition, etc.

Figure 1:
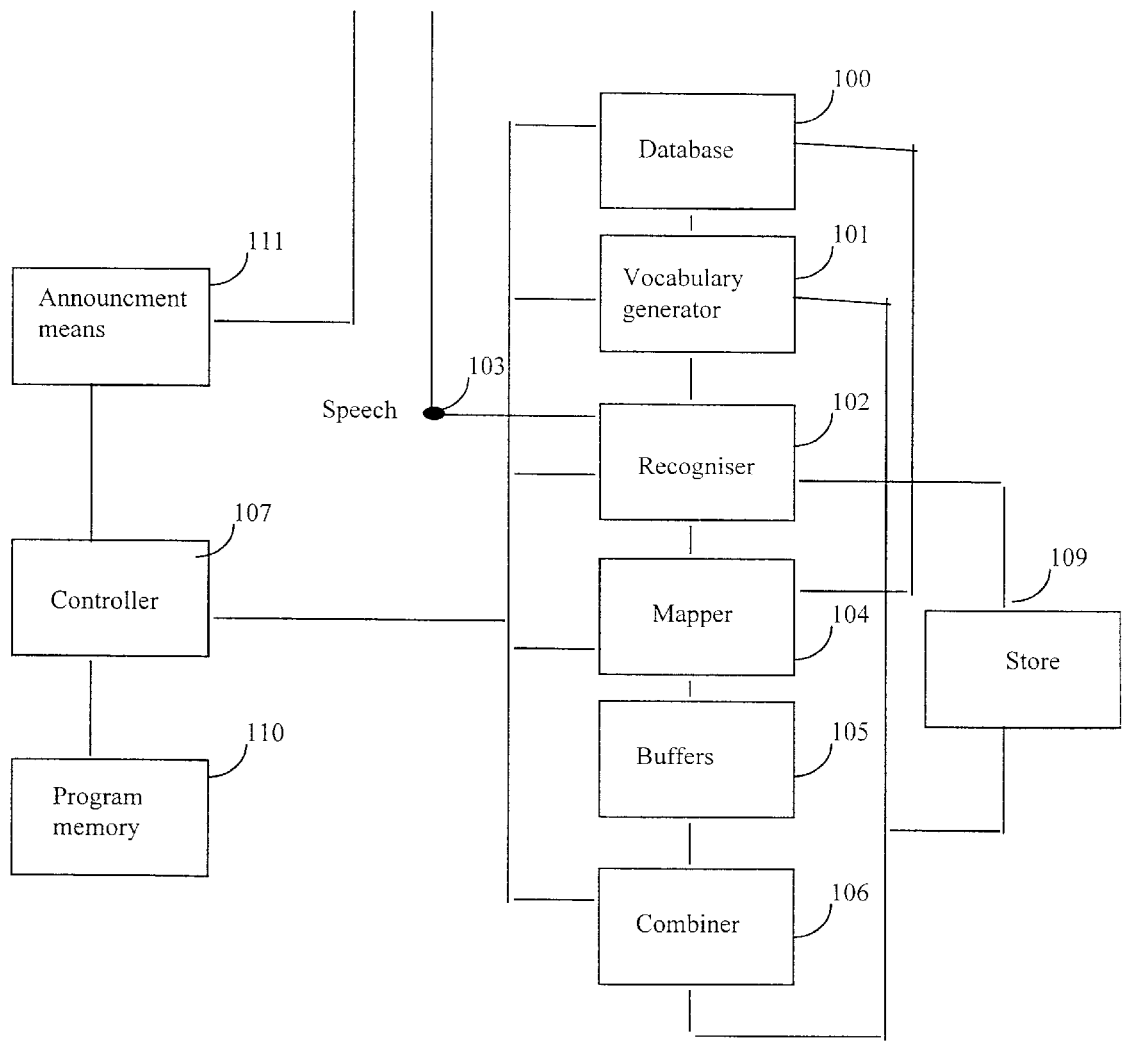
FIG. 1a shows a database for use in the invention.
Figure 1A:
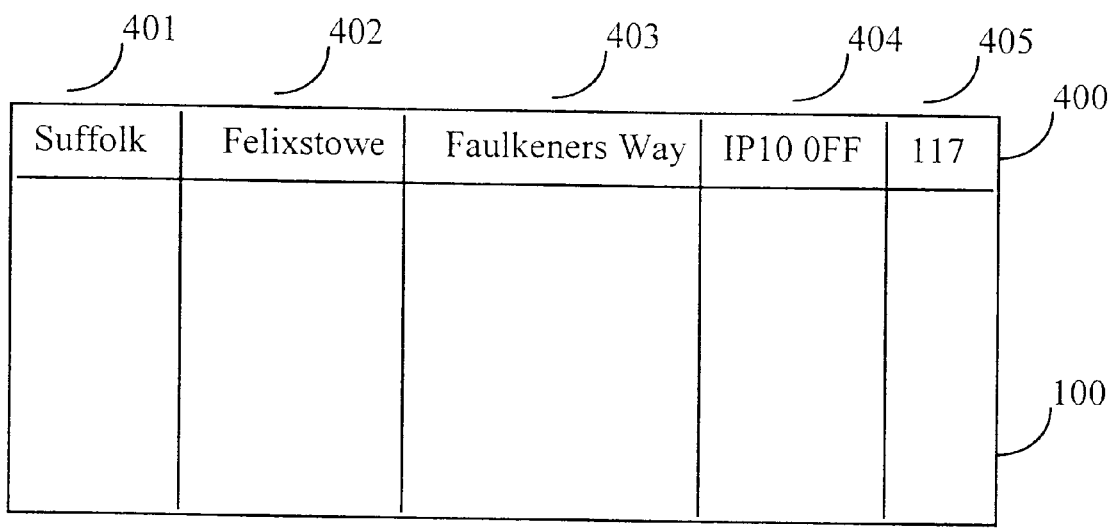

Referring now to FIG. 1 which shows a recognition apparatus according to the present invention and additionally to FIG. 1a which shows schematically an address database 100. A database 100 contains a plurality of entries 400 each entry comprising a number of fields 401, 402, 403, 404, 405. Each entry 400 represents an address and each field 401, 402, 403, 404, 405 contains a machine representation of an item of the address. In the example shown the database entry 400 represents the address "117 Faulkeners Way, Felixstowe, Suffolk, IP10 OFF". The field 401 contains a machine representation of a county, in this case the letter sequence "Suffolk". The field 402 contains a machine representation of a town name the field 403 contains a machine representation of a road name and so on.

A control unit 107 in the form of a stored-program controlled processor is used to control a vocabulary generator 101, a recogniser 102, a mapper 104, buffers 105 a combiner 106 and an announcement means 111. The operation of the control unit 107 is determined by the contents of a program memory 110. The control means controls the announcement means 111 to generate speech in order to elicit spoken responses from the user. Audio input and outputs 103, 112 are connected to enable two-way communication with the user, perhaps via a telephone line.

The vocabulary generator 101 is instructed by the control unit to read from the database certain items of information. As a result of such a read operation the vocabulary generator receives machine representations of items from the database. For example the vocabulary generator might receive machine representations of items in the county field of the database. The vocabulary generator generates a vocabulary from the received machine representations. The vocabulary generator is arranged to generate a vocabulary which includes representations of various pronunciations of the received machine representations. For example, a postcode vocabulary would include the options of saying "double F" for "FF" and "ten" for "10". Issues surrounding pronunciation, homophones and homonyms are discussed in our International patent application number WO97/28634. The generated vocabulary is received by a recogniser 102 which is thereby configured to perform recognition according to the generated vocabulary. The announcement means is controlled to ask the user for a particular item of information. The recogniser 102 receives a speech signal via an input 103 and compares the received speech signal with items in the generated vocabulary. The recogniser provides as an output a recognition candidate list corresponding to the items in the vocabulary which most closely resemble the received speech signal, the item which most closely resembles the received speech signal being the first in the list and so on. For example, if the recogniser has been configured to recognise county names, the announcement means generates a prompt such as "Please say the county name" and the user says "Suffolk" the recognition candidate list might comprise a list of the words "Sussex, Essex, Suffolk".

Figure 7:
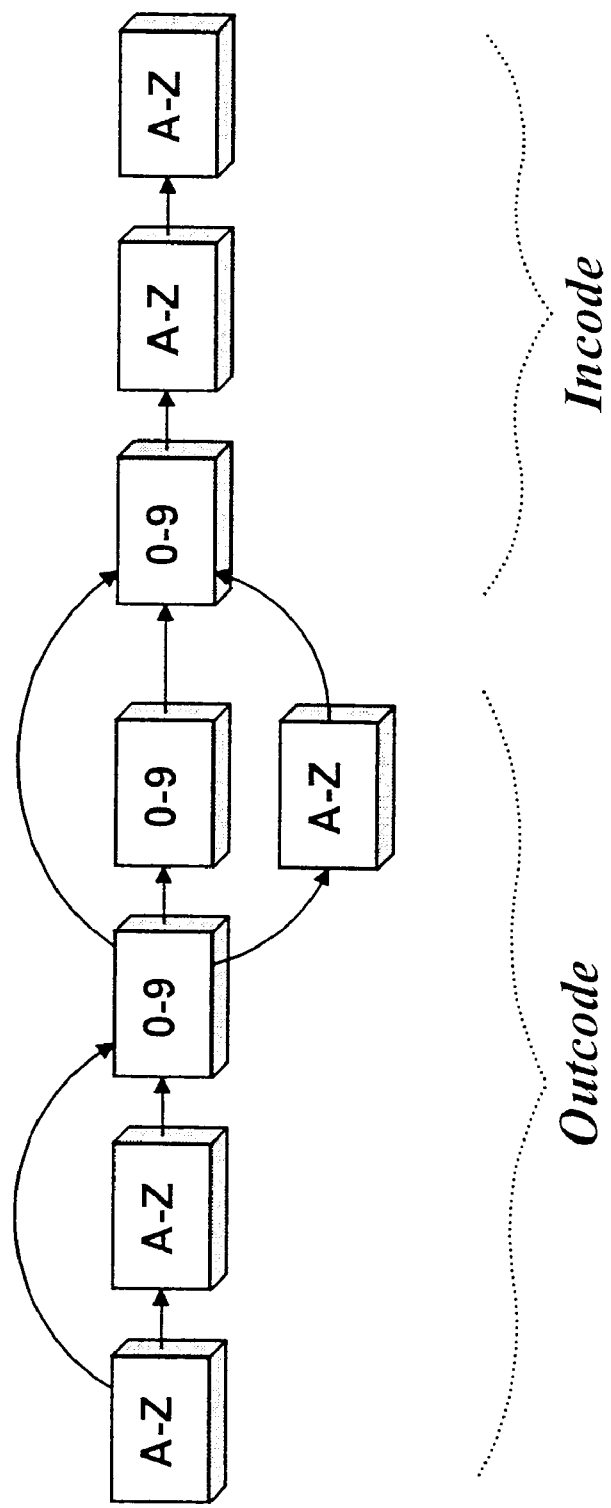
FIG. 7 shows schematically a recognition vocabulary for a UK postcode recogniser.

There is a relationship between the first one or two letters of a postcode and the county within which the postcode falls. A UK postcode is generally separable into two parts the first part comprising a sequence of letters followed by one or two digits and the second part comprising a number followed by a sequence of letters. The first part is known as the outcode and is generally of the form "aann", but some outcodes have a single letter, e.g. "L" is the outcode letter for Liverpool, and some outcodes have another letter following the first sequence of digits e.g. EC1N. FIG. 7 shows schematic representation of a recognition vocabulary which may be used for a postcode recogniser.

In a dialogue where the user has been asked to provide a postcode and a county the speech signals can be recognised using a postcode recogniser and a county name recogniser respectively. With reference to the relationship between the two it is possible to combine recognition results for the postcode with recognition results for the county.

The recognition candidate list is received by a mapping means 104 is instructed by the control unit 107 to map the received candidate list onto a mapped candidate list. The mapping means 104 uses information in the database 100 to provide as an output a mapped candidate recognition list. For example, if the mapper is instructed to map the received candidate list (comprising county names) onto outcode letters the candidate list "Sussex, Essex, Suffolk" would map onto "BN, RH, TN, GU, PO, CB, CO, IP, NR, CM". The mapping means maintains order of the mapped candidate list (i.e. most likely first) in accordance with the order of the received candidate list. In variants candidate list may have scores which are associated with each candidate as described in our international Patent Application WO96/13030. Mapped candidate lists are stored in buffers 105 and two mapped candidate lists may be combined using the combining means 106. For example a second mapped candidate list could be generated as a result of recognising a speech signal representing a postcode. If the user says "IP10 OFF" then the recognition candidate list might be "ID10 OSS, IP9 OFF, IP10 OFF, AP10 OSS" and the mapped candidate list would be "ID, IP, AP".

A combined result list from the combining means 106 is received by the vocabulary generator 101 and used to generate a new vocabulary for use by the recogniser 102. In the example described, if the two mapped candidate lists were combined using intersection then the combined result would be the list "IP". The vocabulary generator might be instructed by the control unit 107 to access the database and to generate a vocabulary which comprises all the road names in the database which have a post code staring with the letters "IP".

According to a current UK address database an outcode, which typically defines a district, has on average 270 road names within the district, with a maximum of 1148. The strategy used by the recognition apparatus to identify a required database entry is controlled by the control unit 107. An identified entry is provided via an output 108 from the combiner 106.

The invention is primarily, although not exclusively focused towards applications where confirmation of recognition results with the caller is not possible. Only one identified database entry is proposed together with some degree of certainty that it is correct. In order to gain high accuracy some results are rejected. In designing the strategy used by the preferred embodiment both the accuracy of the result and the fraction of calls accepted (i.e. not rejected) are considered.

An automated system using speech recognition may store each users speech signals and the identified entry in an optional store 109, in addition to identifying database entries using the speech signals. This allows an operator to listen to what the user has said and to compare this with the entry identified by the automated system. If the automated system is capable of providing and storing along with the speech signals a grading signal which indicates whether the identified entry is considered high medium or low accuracy, then this grading signal can be used to direct such a manual checking process.

Combining recognition results with each other and comparing combined results with entries in the database facilitates the production of such a grading signal. It is possible to grade a transcribed address with a high, medium or low accuracy, and to provide performance figures relating to these gradings. An example of such grading and performance figures might be that 42.9% of results are graded as high accuracy and these results have an accuracy of 96.7%, 21% of calls are graded as medium accuracy and these results have an accuracy of 73.3% and 35.8% of calls are graded as low accuracy and these results have an accuracy of 61.4%.

Figure 6:
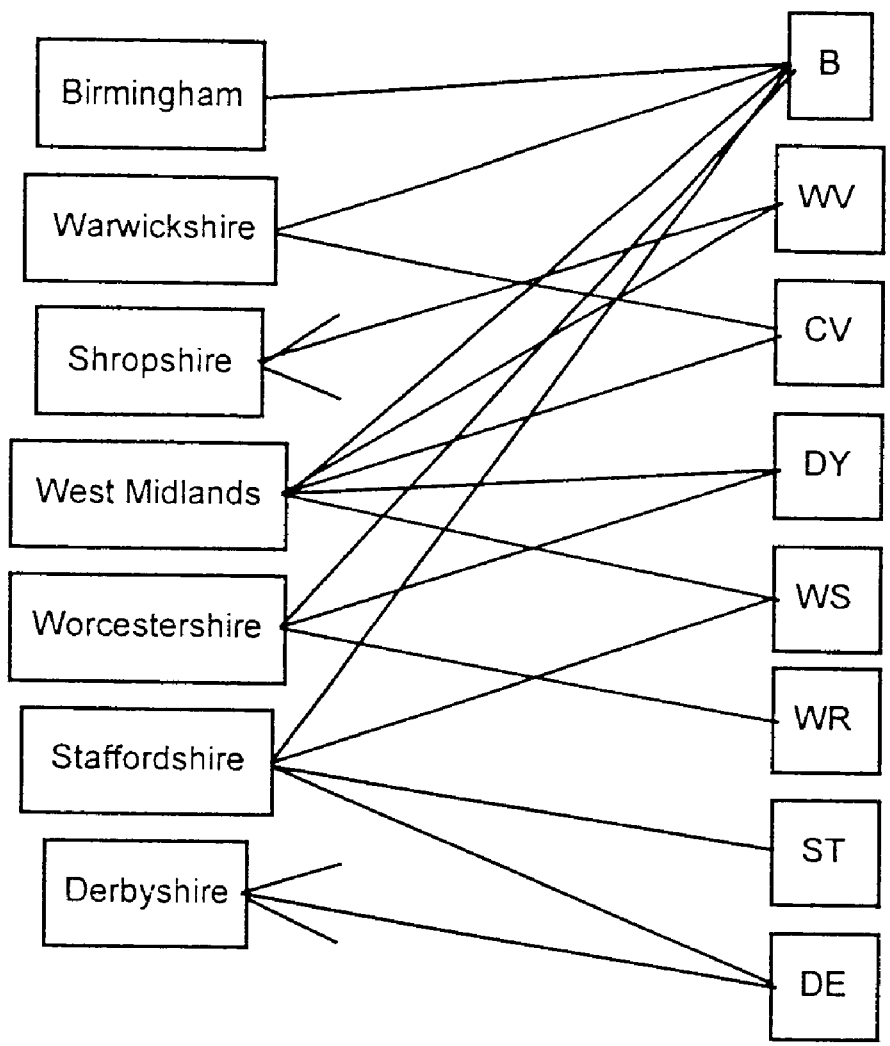
FIG. 6 shows an example of a relationship between county names and outcode letters.

In order to combine recognition results with each other each recognition candidate list needs to be mapped onto a common representation as described below. For example county names and postcodes may be mapped to outcode letters. The relationship between county name and outcode letters is complex with some outcode letters corresponding to areas which straddle county boundaries whilst some counties can be divided into a plurality of areas each having respective different outcode letters. A diagram showing part of the relationship between county names and outcode letters in a particular UK address database is shown in FIG. 6. In the example shown county name lists were created using data relating to what a user says when asked for a county. For example some users when asked to say the county name respond "Birmingham".

Such a relationship may be conveniently stored in a database, the database being used to provide a mapping from one of the sets of recognition results (e.g. the recognised county) to the other (e.g. the outcode letters). The common representation could be the same representation as either one of the recognition candidate lists if there is a direct relationship between the representations. For example a user is asked to say a town name and responds "Ipswich" then the first recognition candidate list from the recogniser when configured to recognise town names might be "Ipswich, Norwich". If the user is then asked for a road name and the user says "Faulkeners Way" the recognition candidate list might be "Faulkeners Way, Falcon Way, Mariners Way". Road names could be used as a common representation as the first recognition candidate list could be mapped onto a list comprising all the road names in Ipswich and Norwich.

If both items have a relationship with a common item of information then both of the sets of recognition results may be mapped onto the common representation in order to facilitate combination of recognition results. For example, if the speech provided by the user represents a county name and a postcode, then outcode letters may be used as a common representation. In which case the county name recognition candidate list and the postcode recognition candidate list are both mapped onto an outcode letter list prior to combination.

Once recognition results have been mapped onto a common representation the mapped result lists from the two recognisers may be combined in one of two ways. If it is important that the correct result is present in the set of combined results then a union should be used, as the probability that the correct result is in neither set of common representations is likely to be extremely low. For example, if the probability that the list of county recognition results does not contain the correct result is 7.4% and the probability that the list of postcode recognition results does not contain the correct result is 6.1% then, assuming that the two events are statistically independent then the probability that neither contain the correct result is 7.4%×6.1%=0.45%. If a single high accuracy result is required then an intersection of the lists should be used. The list of combined recognition results will be shorter than when combination is provided via a union as the combined results will provide a list for which the recognition of two different utterances have agreed a result. The accuracy will therefore be higher but there is a chance that there will be no results in the combined list.

Combination of recognition results using intersection is referred to as cross checking in this description. The result of cross checking is a list of cross matches also referred to as agreed results in this description.

When cross checking the results from two recognition processes the length of the candidate lists which are combined is significant because using only the top candidate limits the chance of a cross match whereas using longer lists increases the chance of more than one conflicting cross match.

Combining results from the recognition results obtained by recognising different utterances provides a result of higher accuracy as follows. If the accuracy of an outcode letter recogniser is 78.9% and the accuracy of a county name recogniser is 79.1% then using either one or the other will give a fairly low recognition accuracy. If the recognition results are mapped onto a common representation and the results are combined using an intersection of the mapped results then it is possible to obtain a higher accuracy result if the recognisers have agreed a single result. However, if there are no results in the combined set then it is not possible to infer which, if either, of the recognition result set contains the correct result. Similarly if there are more than one agreed result it is not possible to infer which one is correct, although relative rankings or candidate scores (if they are available) can be used to rank the agreed results.

When combining the recognition results obtained by recognising different utterances the performance achieved depends on the number of candidates included from each list. It may seem beneficial to include the maximum number of recognition results provided by each recogniser and so have the highest probability that the correct recognition result is contained in each set. However, as the number of candidates considered increases so too does the chance of a random match. Random matches reduce the likelihood that a match is correct. With longer candidate lists there also an increased likelihood of more than one match. There is an optimum number of recognition results that should be combined from each recognition result list in order to maximise the probability of obtaining only one agreed correct result.

Figure 2:
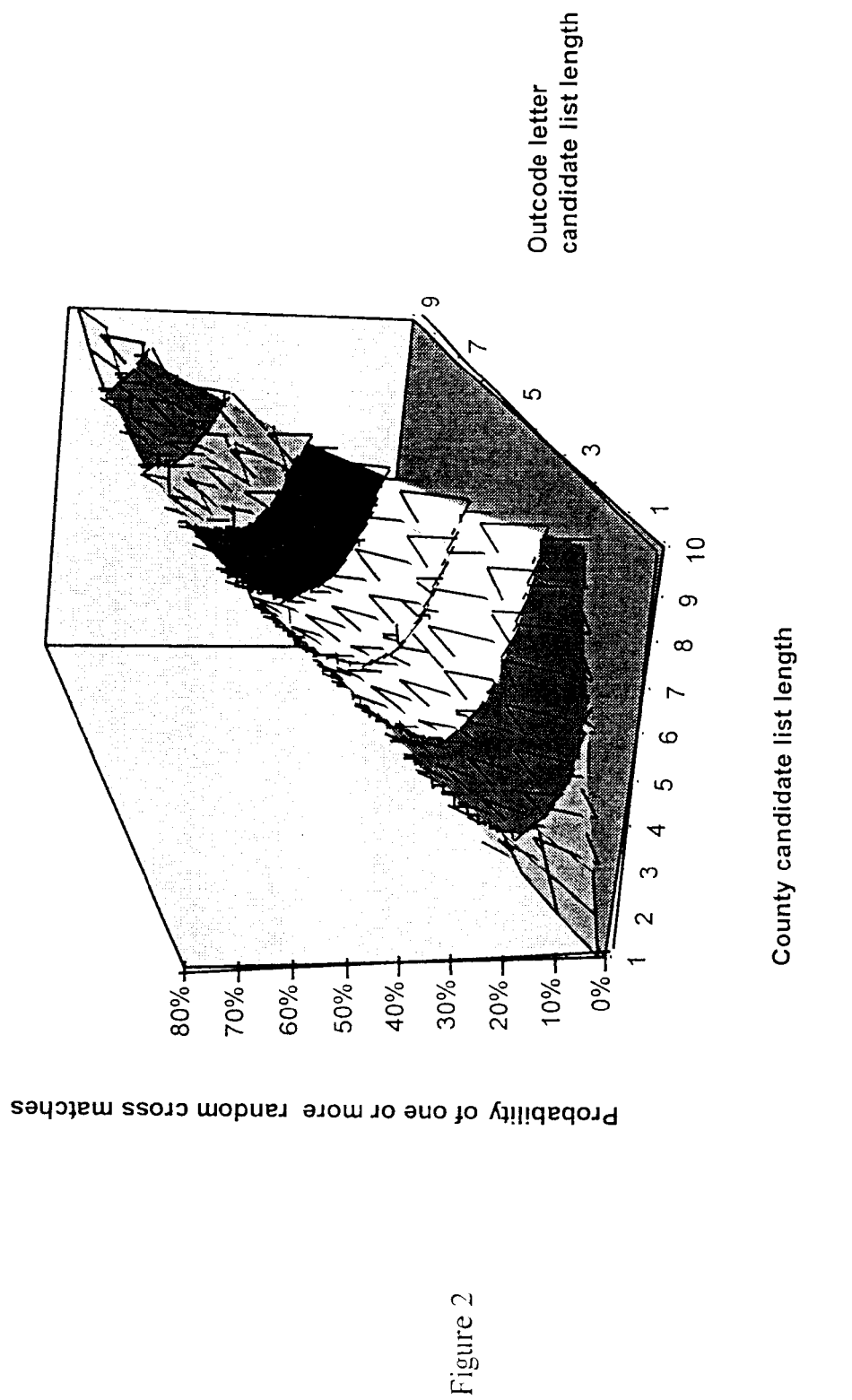
FIG. 2 shows the estimated probabilities of random cross matches between recognition candidate lists from a postcode letter recogniser and recognition candidate lists for a county name recogniser.

In order to determine the optimal list lengths for use in the preferred embodiment of the invention the likelihood of random cross matches is determined. If different numbers of items are selected randomly from the vocabulary of each recogniser and these randomly selected items are mapped onto a common vocabulary then the number of random cross matches may be determined. If many random selections are carried out (in a so-called monte carlo simulation) then it is possible to estimate the probability of a random cross match. FIG. 2 shows the estimated probabilities of random cross matches between recognition candidate lists from a postocde letter recogniser and recognition candidate lists from a county name recogniser. At candidate list lengths of 10 the probability of a random cross match is estimated as 80%.

In order to calculate the theoretical accuracy for a recognition apparatus utilising combined results it is necessary to assume that recognition results from recognition of different words (in this case county name and postcode) are independent from each other. In practice it may be found that certain users speech signals are poorly recognised for both the postcode and county (due to an accent or a difficult to understand voice) and therefore calculating recognition accuracy as if the recognition results are independent will only provide an estimate of the achieved accuracy.

Figure 3:
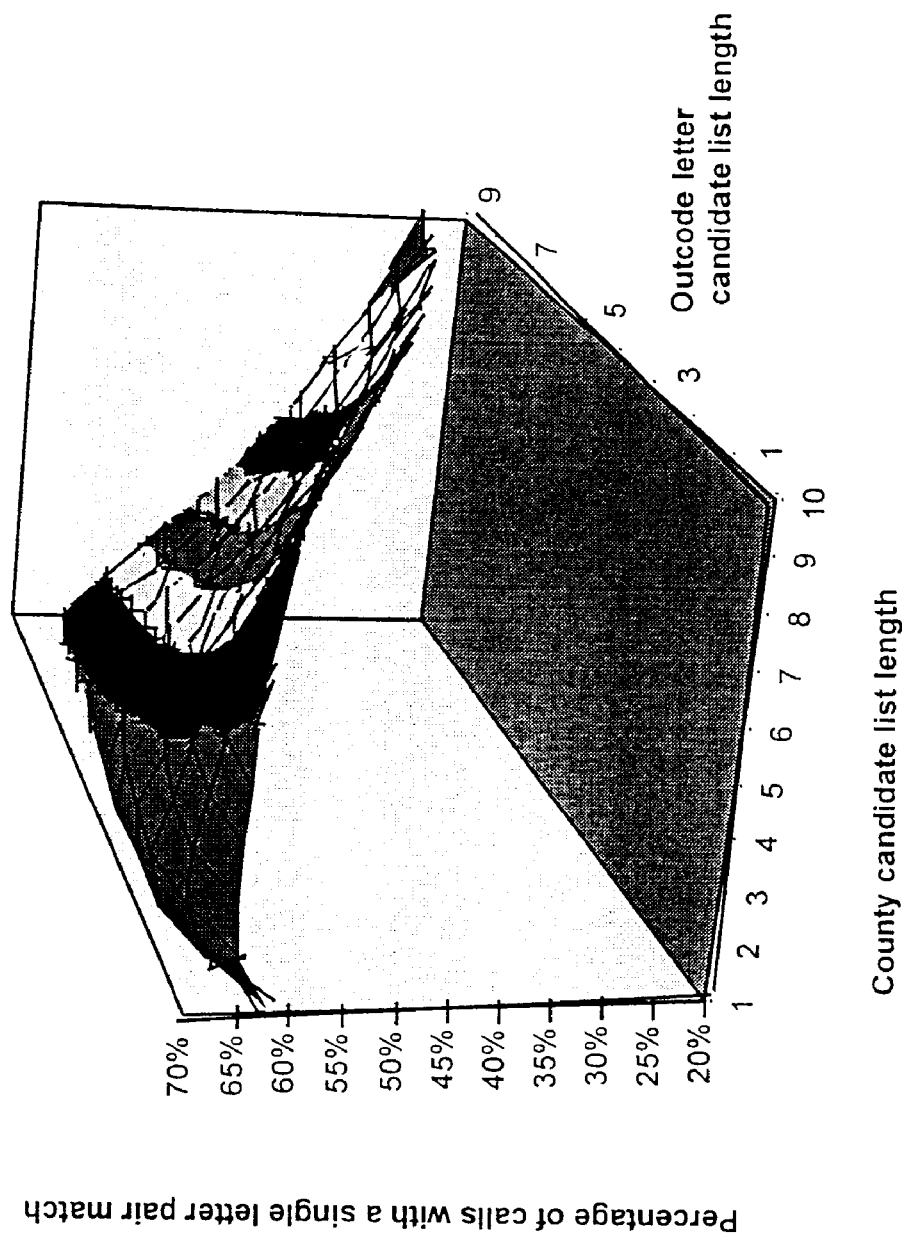
FIG. 3 shows the percentage of combined recognition results which have a single cross match for a recognition apparatus which combines results from a county name recogniser and a postcode recogniser.

FIG. 3 shows the estimated percentage of calls which results in a single cross match for a recognition apparatus which combines mapped results from a county name recogniser and a postcode recogniser.

Figure 4:
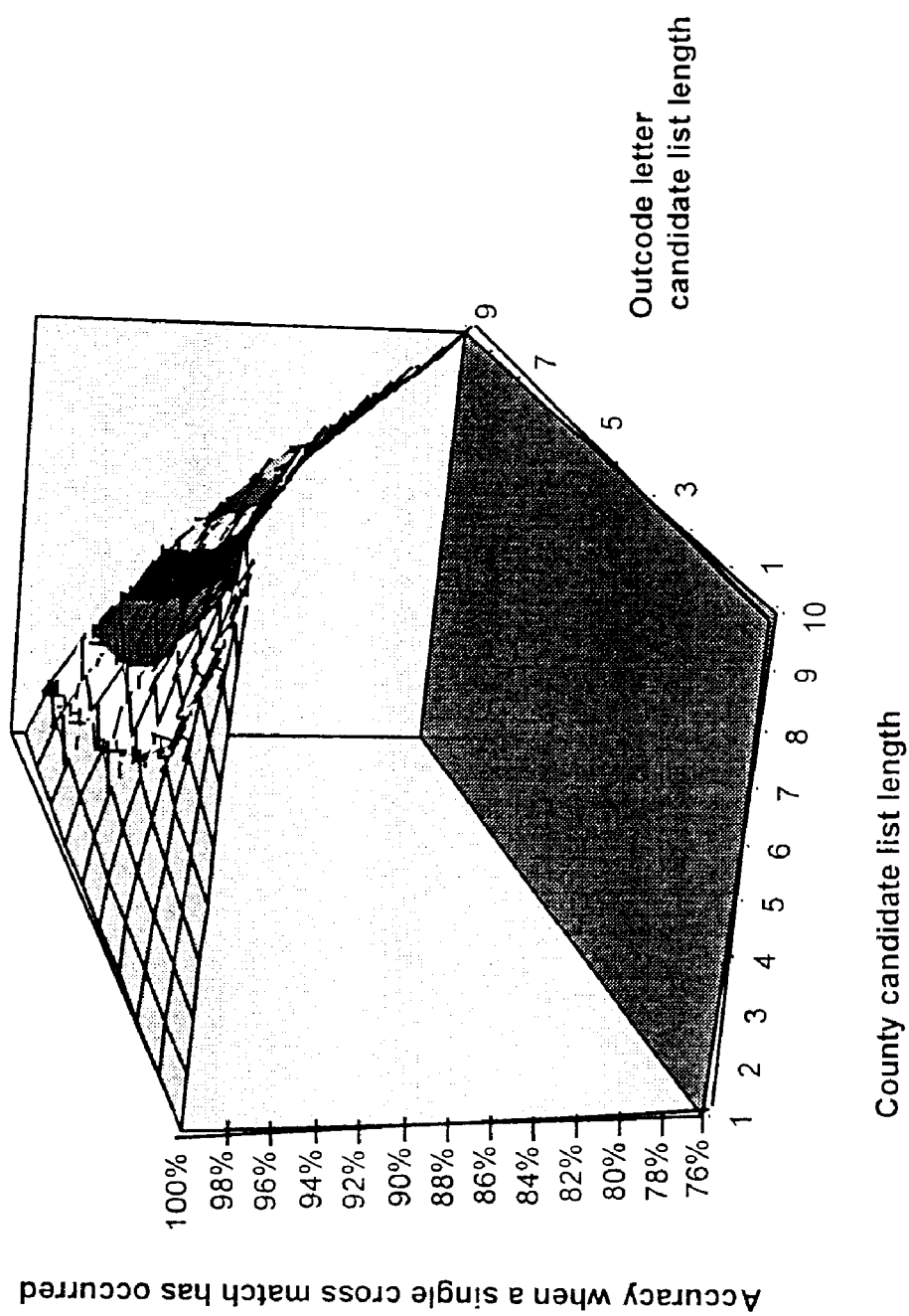
FIG. 4 shows the estimated accuracy of a combined recognition result, when one cross match is found between the mapped recognition lists, as a function of the list lengths for the recogniser of FIG. 3.

FIG. 4 shows the theoretical accuracy of the combined recognition result, when one cross match is found between the mapped candidate lists, as a function of the list lengths. For maximum accuracy of the combined recognition result it is required to minimise the recognition candidate list lengths, thus reducing the chance of a random match. FIG. 4 shows that the accuracy of the combined result falls significantly with increasing length of candidate lists. Thus long candidate lists should be avoided when combining results using intersection as the accuracy of the combined result drops off dramatically.

Figure 4A:
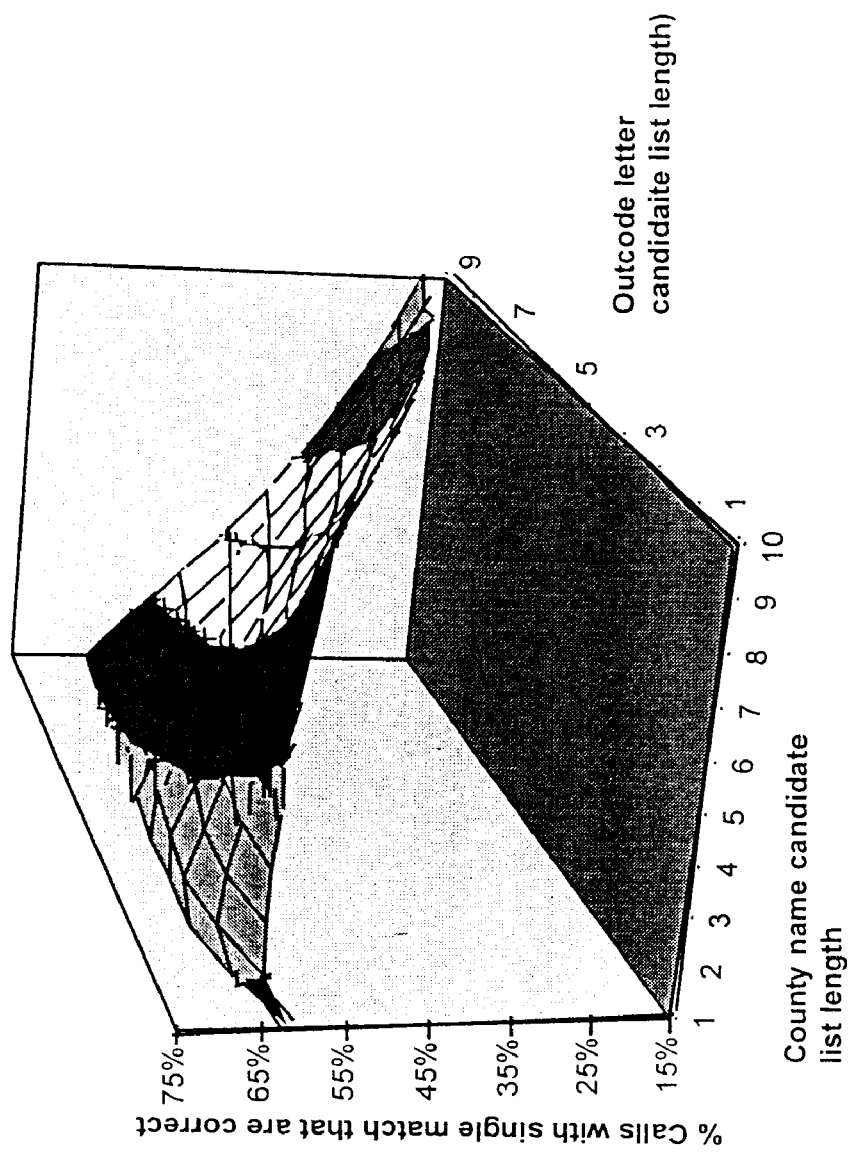
FIG. 4a shows the estimated accuracy of the recogniser of FIG. 3.

FIG. 4a shows the estimated accuracy of the combined recognition result for the recogniser of FIGS. 3 and 4. A theoretical maximum is found when the mapped outcode letter list obtained from the postcode recognition candidate list is limited to 3 and the candidate list from the county name recogniser is limited to 2. The shape of this surface can be understood as follows. For short lists the accuracy is limited by the accuracy of the individual recognisers ie the likelihood that the correct result occurs in the candidate list provided by each recogniser. There is a low chance, for shorter recognition candidate lists, of a random cross match between lists. When longer candidate lists are used the probability of the recognition candidate list containing the correct candidate increases, but so too does the probability of a random cross match.

In the embodiment of the invention described here, recognition candidate lists from a county name recogniser and a postcode recogniser are combined to provide a list of outcode letters. Once the list of outcode letters has been obtained by combining the mapped results, it is possible to create a second postcode vocabulary based on the outcode letters obtained. The original utterance of the postcode is then rerecognised using a constrained vocabulary limited to all postcodes with the initial letter or letter pair of the obtained outcode letters. Experiments have shown that including such a re-recognition process improves the accuracy of the recognised postcode. The reason for this increase in accuracy is because the vocabulary used by the recogniser for re-recognition is generally smaller than the vocabulary used (as shown in FIG. 7) for the first postcode recognition.

The next stage in address recognition is to identify the road name. The vocabulary used for the road name recogniser is determined using previous results obtained for the postcode and previous results obtained for the outcode(note in this particular embodiment the outcode is used here rather than the outcode letters. A relationship defined in a database is used to determine all of the road names which correspond to all of the postcodes in a recognition candidate list provided by a previous recognition process. A second vocabulary is provided using a relationship defined in a database to determine all of the road names which correspond to one of the outcodes in a another recognition candidate list.

The accuracy of a road name recognition will depend on how the postcodes or outcodes are used to build the road name vocabularies are determined. In the embodiment of the invention described here the utterance of the road name is recognised using a recogniser configured with two different vocabularies. The first is configured with a short vocabulary derived from a recognition candidate list of postcodes, whilst the second is configured with a much larger vocabulary derived from a recognition candidate list of outcodes. The candidate recognition lists from the two recognition process are combined using the intersection of the two lists.

Figure 5:
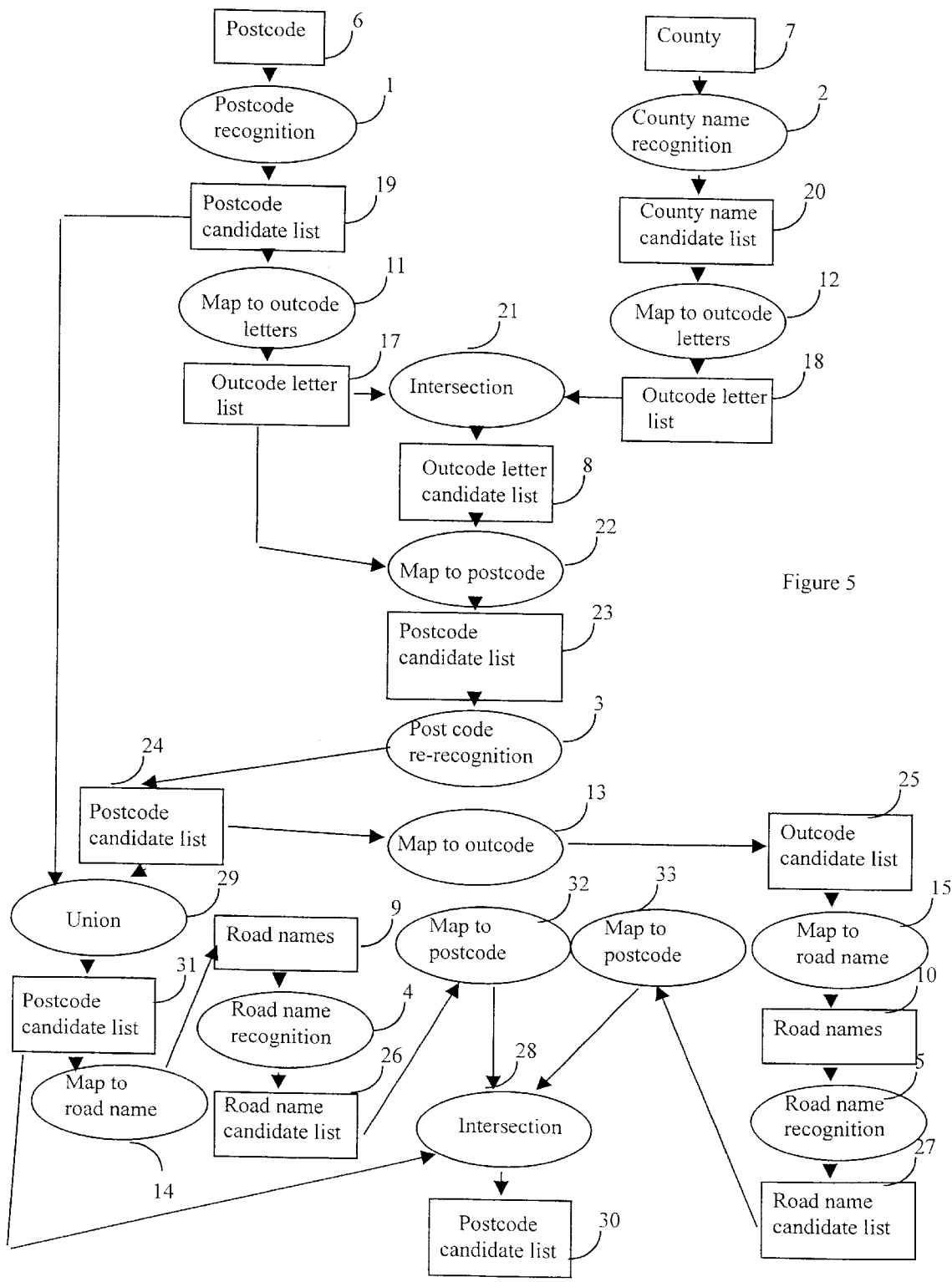
FIG. 5 shows a functional representation of the process steps in the apparatus of FIG. 1.

Referring now to FIG. 5 which shows a functional representation of the process steps in a recognition apparatus embodying the invention. Recognition processes 1, 2, 3, 4, 5 are each configured to recognise a vocabulary of postcodes 6, county names 7, postcodes 8, road names 9, and road names 10. The recognition vocabulary may comprise items in a particular field in a database or may be created by a mapping process for example 14 or 15.

The recognition process 2 is configured to recognise a county name vocabulary 7, which is created using machine representations of items in the county field of entries in the database 100. A county name candidate list 20 is produced by the recognition process 2 in response to a first user speech signal, corresponding to the first received speech signal this invention. The county name candidate list is used to create a mapped candidate list 18, corresponding to the first set of items of this invention, of outcode letters using a mapping process 12. In the preferred embodiment the county name candidate list is limited to a length of 2 prior to the mapping process 12. The mapping process creates a mapped candidate list from items in an outcode letter field of the database for all the database entries which have one of the counties in the county name candidate list in the county field. In variants, the mapping process uses a defined relationship to create the mapped candidate list, or it uses information in another database or lookup table.

Similarly, the recognition process 1 is configured to recognise a postcode vocabulary 6, which has been created using machine representations of items in the postcode field of entries in the database 100. A postcode candidate list 19 is produced by the recognition process 1 in response to a second user speech signal, corresponding to the second received speech signal of this invention. The postcode candidate list is used to created a mapped candidate list 17, corresponding to the second set of this invention, of outcode letters using a mapping process 11 which is analogous to the mapping process 12. In variants, the mapping process uses a defined relationship to create the mapped candidate list, or it uses information in another database or lookup table. In the case of a postcode to outcode or outcode letters translation, truncation of the postcode could be used, for example, The mapped outcode letter list 11 is limited to a length of 3 prior to combination. It should be noted that in the preferred embodiment the county name candidate list 20 is limited in length prior to the mapping process 12, whereas the postcode candidate list 19 is mapped to outcode letters and then the outcode letter candidate list length is limited.

Once the recognition candidate lists 19 and 20 have each been mapped to a common representation (in this case an outcode letter list) 17 and 18 respectively the mapped candidate lists are combined using an intersection process 21, corresponding to the combinatorial function of this invention. The result of the intersection process is an outcode letter candidate list 8, corresponding to the combined set of this invention, of outcodes which occur in both the outcode list 17 and the outcode list 18.

The outcode letter candidate list 8 is then mapped onto an intermediate postcode candidate list 23 by a mapping process 22. If the outcode candidate list 8 contains no items i.e. there was no cross match in the outcode lists 17 and 18 then the first item in the outcode letter list 17 is used to produce the intermediate post-code candidate list 23. The mapped postcode candidate list 23 is used to create a vocabulary, which is used to configure a recognition process 3. The recognition process 3 produces a second postcode candidate list 24 in response to the second user speech signal. Thus the second user speech signal is re-recognised using a smaller vocabulary than in the previous recognition process 1, which generally will produce a more accurate result. The second postcode candidate list 24 and the first postcode candidate list 19 are then combined using a union process to produce a third postcode candidate list 31. The third postcode candidate list 31 is then used by a mapping process 14 to produce a road name vocabulary 9.

The second postcode candidate list 24 is used by a mapping process 13 to create a corresponding second outcode candidate list 25 which is then used by a mapping process 15 to generate a road name vocabulary 10. In the preferred embodiment the outcode candidate list is limited to a length of one prior to generation of the road name vocabulary. The road name candidate lists 9 and 10 are used to configure recognition processes 4 and 5. Recognition processes 4, and 5 then produce respective road name candidate lists 26 and 27 respectively in response to the same user speech signal representing a road name. As the road name candidate lists already share a common representation there is no need for a mapping process prior to combination using an intersection process 28. In the preferred embodiment a postcode identification is required so the road name candidate lists 26 and 27 are mapped to a postcode lists 32 and 33 prior to the intersection process 28. In this embodiment, because one road name may relate to more that one postcode the postcode candidate list 31 is also included in the intersection process 28 in order to make sure that the identified postcode relates to the second speech signal provided by the user rather than to another post code relating to the same road name.

After the intersection process 28 it is possible to identify the required postcode.

The identified postcode output by the combiner 106 of FIG. 1 and is stored in the store 109. A grading signal is also provided and stored according to the result of the intersection process. If one cross match is found and the agreed result corresponds to the top candidate in each of the road name candidate lists 26 and 27 then a signal representing high accuracy is stored. If one cross match is found which does not correspond to the top candidate in both the road name candidate lists then a signal representing medium accuracy is stored. If more than one cross match is found the most likely of the cross matched candidate list is used and the result is graded as low accuracy. If no cross matches are found then the most likely candidate from the road name candidate list 26 is used and a signal representing low accuracy is stored.

In another embodiment of the invention speech signals are recognised using different recognisers, for example speech recognisers which have been trained using different training data from each other or speech recognition apparatus provided by different companies prior to combing recognition candidate lists.

In another embodiment of the invention speech signals which are different from each other are recognised using recognisers configured to recognise the same vocabulary as each other prior to combining recognition candidate lists.

What is claimed is:

1. A speech recognition apparatus comprising
   input means for receiving a speech signal;
   recognition means coupled to the input means and arranged to
      provide a first set of one or more items falling within a first vocabulary, said items being derived from a first received speech signal; and
      provide a second set of one or more items falling within a second vocabulary, said items being derived from a second received speech signal; and
   comparison means arranged to
      perform an intersection of the first and second set whereby the combined set comprises items which fall within both the first set and items which fall within the second set;
      provide a resulting combined set of items; and
      provide as an output a grading signal in dependence upon the number of items which fall within the combined set.

2. A speech recognition apparatus according to claim 1 in which the first received speech signal constitutes the second received speech signal.

3. A speech recognition apparatus according to claim 1 in which the first received speech signal is different from the second received speech signal.

4. A speech recognition apparatus according to claim 3 further comprising a database containing entries each comprising a plurality of fields in which the recognition means is arranged to derive the first set of items from the speech signal by
   generating a first intermediate set of items falling within an intermediate vocabulary comprising items in a first field of the database, said intermediate set of items corresponding to the first received speech signal;
   the first set of items comprising items in a second field of an entry in the database which have items from the first intermediate set in the first field of the entry.

5. A speech recognition apparatus according to claim 4 in which the recognition means is arranged to derive the second set of items from the speech signal by
   generating a second intermediate set of items falling within an intermediate vocabulary comprising items in a third field of the database, said intermediate set of items corresponding to the second received speech signal;
   the second set of items comprising items in the second field of an entry in the database which have items from the second intermediate set in the third field of the entry.

6. A speech recognition apparatus according to claim 1 in which the comparison means is arranged to limit the size of the first and second sets to a predetermined number of items prior to comparison.

7. A speech recognition apparatus comprising
   input means for receiving a speech signal;
   recognition means coupled to the input means and arranged to
      provide a first set of one or more items falling within a first vocabulary, said items being derived from a first received speech signal; and
      provide a second set of one or more items falling within a second vocabulary, said items being derived from a second received speech signal; and
   comparison means arranged to
      perform a union of the first and second set whereby the combined set comprises items which fall within the first set or items which fall within the second set; and
      provide a resulting combined set of items.

8. A speech recognition apparatus according to claim 7 in which the recognition means is further arranged to generate an output set of items falling within the combined set of items, said output set being derived from a third received speech signal.

9. A speech recognition apparatus according to claim 8 in which the first received speech signal is different from the second received speech signal and further comprising a database containing entries each comprising a plurality of fields in which the recognition means is arranged to derive the first set of items from the speech signal by
   generating a first intermediate set of items falling within an intermediate vocabulary comprising items in a first field of the database, said intermediate set of items corresponding to the first received speech signal;
   the first set of items comprising items in a second field of an entry in the database which have items from the first intermediate set in the first field of the entry.

10. A speech recognition apparatus according to claim 9 in which the recognition means is arranged to derive the second set of items from the second received speech signal by generating a second intermediate set of items falling within an intermediate vocabulary comprising items in a third field of the database, said intermediate set of items corresponding to the second received speech signal;

the second set of items comprising items in the second field of an entry in the database which have items from the second intermediate set in the third field of the entry.

11. A speech recognition apparatus according to claim 8 in which the recognition means is arranged to derive the output set of items from the third received speech signal by generating a third intermediate set of items comprising items in a first field of an entry in the database which have items from the combined set in a second field of the entry;

the output set of items comprising items within the third intermediate set which correspond to the third received speech signal.

12. A speech recognition apparatus according to claim 8 in which the first received speech signal constitutes the second received speech signal.

13. A method of speech recognition comprising steps of receiving a first and a second speech speech signal;

providing a first set of one or more items falling within a first vocabulary, said items being derived from the first received speech signal;

providing a second set of one or more items falling within a second vocabulary, said items being derived from the second received speech signal;

performing an intersection of the first and second set whereby the combined set comprises items which fall within both the first set and items which fall within the second set;

providing a resulting combined set of items; and providing as an output a grading signal in dependence upon the number of items which fall within the combined set.

14. A method of speech recognition according to claim 13 in which the first received speech signal constitutes the second received speech signal.

15. A method of speech recognition according to claim 13 in which the first received speech signal is different from the second received speech signal.

16. A method of speech recognition according to claim 15 in which the step of providing a first set of items is performed with reference to a database containing entries each comprising a plurality of fields and said step comprises the substeps of generating a first intermediate set of items falling within an intermediate vocabulary comprising items in a first field of the database, said intermediate set of items corresponding to the first received speech signal; and providing the first set of items such that the first set comprises items in a second field of an entry in the database which have items from the first intermediate set in the first field of the entry.

17. A method of speech recognition according to claim 16 in which the step of providing a second set of items comprises the substeps of generating a second intermediate set of items failing within an intermediate vocabulary comprising items in a third field of the database, said intermediate set of items corresponding to the second received speech signal; and providing the second set of items such that the second set comprises items in the second field of an entry in the database which have items from the second intermediate set in the third field of the entry.

18. A method of speech recognition according to claim 13 further comprising the step of limiting the size of the first and second sets to a predetermined number of items prior to the comparison step.

19. A method of speech recognition comprising the steps of receiving a first and a second speech signal;

providing a first set of one or more items falling within a first vocabulary, said items being derived from the first received speech signal;

providing a second set of one or more items falling within a second vocabulary, said items being derived from a second received speech signal;

performing a union of the first and second set whereby the combined set comprises items which fall within the first set or items which fall within the second set; and providing a resulting combined set of items.

20. A method of speech recognition according to claim 19 further comprising the steps of receiving a third speech signal and generating an output set of items falling within the combined set of items, said output set being derived from the third received speech signal.

21. A method of speech recognition according to claim 20 in which the first received speech signal is different from the second received speech signal and in which the step of providing a first set of items is performed with reference to a database containing entries each comprising a plurality of fields and said step comprises the substeps of generating a first intermediate set of items falling within an intermediate vocabulary comprising items in a first field of the database, said intermediate set of items corresponding to the first received speech signal; and providing the first set of items such that the first set comprises items in a second field of an entry in the database which have items from the first intermediate set in the first field of the entry.

22. A method of speech recognition according to claim 21 in which the step of providing a second set of items comprises the substeps of generating a second intermediate set of items falling within an intermediate vocabulary comprising items in a third field of the database, said intermediate set of items corresponding to the second received speech signal; and providing the second set of items such that the second set comprises items in the second field of an entry in the database which have items from the second intermediate set in the third field of the entry.

23. A method of speech recognition according to claim 19 in the step of generating the output set of items comprises the substeps of generating a third intermediate set of items comprising items in a first field of an entry in the database which have items from the combined set in a second field of the entry;

providing the output set such that the output set of items comprises items within the third intermediate set which correspond to the third received speech signal.

24. A method of speech recognition according to claim 20 in which the first received speech signal constitutes the second received speech signal.

* * * * *